United States Patent [19]

Tezuka et al.

[11] Patent Number: 4,759,236
[45] Date of Patent: Jul. 26, 1988

[54] SYSTEM FOR CONTROLLING THE PRESSURE OF OIL IN A SYSTEM FOR A CONTINUOUSLY VARIABLE TRANSMISSION

[75] Inventors: Kazunari Tezuka, Asaka; Yasuhito Sakai, Tokyo, both of Japan

[73] Assignee: Fuji Jukogyo Kabushiki Kaisha, Tokyo, Japan

[21] Appl. No.: 931,742

[22] Filed: Nov. 17, 1986

[30] Foreign Application Priority Data

Nov. 22, 1985 [JP] Japan .................. 60-262959

[51] Int. Cl.⁴ ............ B60K 41/18; B60K 41/12
[52] U.S. Cl. .................. 74/866; 74/867; 364/424.1
[58] Field of Search ............ 74/866, 867, 868; 364/424.1

[56] References Cited

U.S. PATENT DOCUMENTS

| | | | |
|---|---|---|---|
| 4,369,675 | 1/1983 | Van Deursen | 74/864 |
| 4,475,416 | 10/1984 | Underwood | 74/868 |
| 4,522,086 | 6/1985 | Haley | 74/867 |
| 4,579,021 | 4/1986 | Yamamuro et al. | 74/869 |
| 4,590,561 | 5/1986 | Abo et al. | 74/866 X |
| 4,638,689 | 1/1987 | Sakai | 74/866 |
| 4,663,991 | 5/1987 | Nakamura et al. | 74/866 X |
| 4,669,336 | 6/1987 | Okada et al. | 74/867 |
| 4,672,864 | 6/1987 | Morimoto | 474/28 X |
| 4,680,990 | 7/1987 | Ohgami | 74/866 X |

FOREIGN PATENT DOCUMENTS 58-191361 8/1983 Japan .

Primary Examiner—Dirk Wright
Attorney, Agent, or Firm—Martin A. Farber

[57] ABSTRACT

A control system for a motor vehicle provided with a continuously variable transmission. The transmission has a line pressure control valve having ports and a spool for controlling the line pressure of oil supplied to a cylinder of a pulley device of the transmission. When a throttle valve of an engine is rapidly opened, the line pressure is increased so as to prevent a belt of the pulley device from slipping.

6 Claims, 6 Drawing Sheets

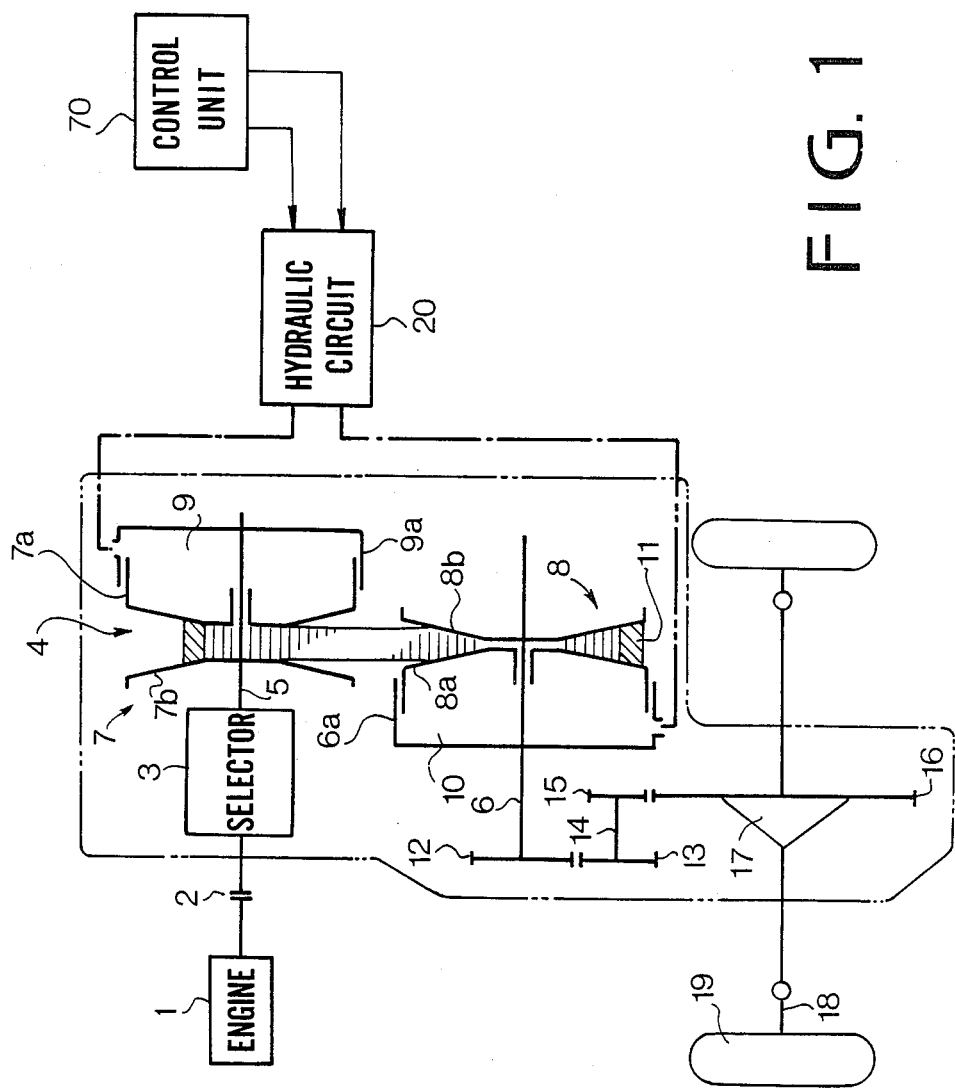
F I G. 1

SYSTEM FOR CONTROLLING THE PRESSURE OF OIL IN A SYSTEM FOR A CONTINUOUSLY VARIABLE TRANSMISSION

BACKGROUND OF THE INVENTION

The present invention relates to a control system for a continuously variable belt-drive automatic transmission for a motor vehicle, and more particularly to a system for controlling line pressure in a hydraulic circuit for the transmission.

A known control system for a continuously variable belt-drive transmission disclosed in U.S. Pat. No. 4,369,675 comprises an endless belt running over a drive pulley and a driven pulley. Each pulley comprises a movable conical disc which is axially moved by a fluid operated servo device so as to vary the running diameter of the belt on the pulleys in dependency on driving conditions. The system is provided with a hydraulic circuit including a pump, a line pressure control valve and a transmission ratio control valve. Each valve comprises a spool to control the oil supplied to the servo devices.

The transmission ratio control valve operates to control the transmission ratio in accordance with the opening degree of a throttle valve of an engine and the speed of the engine. The line pressure control valve is adapted to control the line pressure in accordance with the transmission ratio and the engine torque. The line pressure is controlled to prevent the belt from slipping on the pulleys in order to transmit the output of the engine. However, the control operation for the line pressure is liable to be delayed in a transient state driving condition of the vehicle, where the engine torque and transmission ratio change rapidly.

Japanese Patent Laid Open No. 58-191361 discloses a control system for controlling the line pressure in the transient state driving condition of a vehicle. In the control system, the difference between an actual speed of an engine and a desired speed or the difference between an actual transmission ratio and a desired transmission ratio is detected. A rapid change in the transient state is detected by a larger difference than a predetermined value. At the rapid change, the line pressure is increased for a period. Although the system responds to the change of the transmission ratio without large delay, the system does not quickly respond to the change of engine torque.

Generally, the transmission ratio is determined by the opening degree of a throttle valve and speed of a vehicle. Since the vehicle speed does not quickly change, a rapid change of the transmission ratio can be preliminarily detected by a rapid change of the opening degree of the throttle valve. On the other hand, the engine torque is determined by engine speed and opening degree of the throttle valve. When the transmission ratio is constant, the engine speed is proportional to the vehicle speed and does not immediately change. Accordingly, a rapid change of engine torque can also be detected by a rapid change of the opening degree of the throttle valve.

SUMMARY OF THE INVENTION

Accordingly, the object of the present invention is to provide a system which may preliminarily detect rapid changes of engine torque and transmission ratio by change of opening degree of a throttle valve, and control line pressure so as to prevent the belt from slipping on the pulleys.

According to the present invention, there is provided a control system for a continuously variable transmission for transmitting the power of an internal combustion engine to driving wheels of a motor vehicle through a clutch, having a drive pulley including a hydraulically shiftable disc and a first hydraulic cylinder for shifting the disc, a driven pulley including a hydraulically shiftable disc and a second hydraulic cylinder for operating the disc, a belt engaged with both pulleys, a line pressure control valve having ports and a spool, a transmission ratio control valve having ports and a spool, and a first hydraulic circuit having a pump for supplying oil to the first and second cylinders.

The system comprises a second hydraulic circuit for supplying the oil to the line pressure control valve so as to shift the spool, control valve means provided in a second hydraulic circuit for controlling the amount of the oil supplied to the line pressure control valve, first means for detecting opening degree of a throttle valve of said engine and for producing a first signal, second means responsive to the first signal for producing a second signal representing changing of the opening degree with respect to time, third means responsive to the second signal for detecting a rapid acceleration exceeding a predetermined magnitude and for producing a third signal, fourth means responsive to the third signal for controlling said control valve means to increase the line pressure for a predetermined time so as to prevent slipping of the belt at the rapid acceleration.

The other objects and features of this invention will become understood from the following description with reference to the accompanying drawings.

BRIEF DESCRIPTION OF DRAWINGS

FIG. 1 is a schematic illustration of a continuously variable belt-drive transmission;

DETAILED DESCRIPTION OF THE PREFERRED EMBODIMENT

Figure 2A:
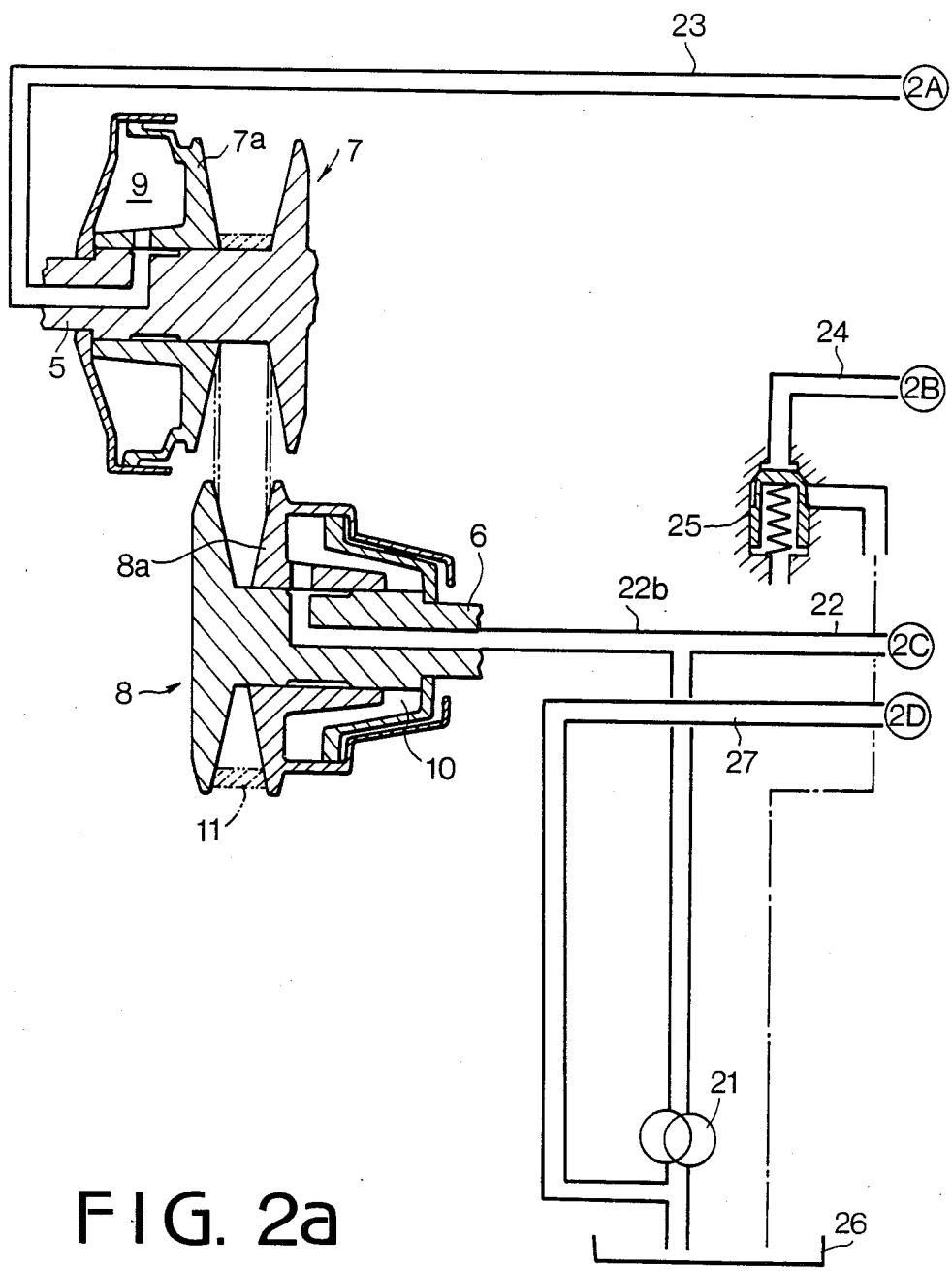
FIGS. 2a and 2b are schematic diagrams showing a control system according to the present invention.

Referring to FIG. 1, a motor vehicle is provided with an engine 1, an electromagnetic powder clutch 2 for transmitting the power of the engine to a continuously variable belt-drive transmission 4 through a selector mechanism 3.

The belt-drive transmission 4 has a main shaft 5 and an output shaft 6 provided in parallel with the main shaft 5. A drive pulley (primary pulley) 7 and a driven pulley (secondary pulley) 8 are mounted on shafts 5 and 6 respectively. A fixed conical disc 7b of the drive pulley 7 is integral with the main shaft 5 and an axially movable conical disc 7a is axially slidably mounted on the main shaft 5. The movable conical disc 7a also slides in a cylinder 9a formed on the main shaft 5 to provide a servo device. A chamber 9 of the servo device communicates with a hydraulic circuit 20.

A fixed conical disc 8b of the driven pulley 8 is formed on the output shaft 6 opposite a movable conical disc 8a. The conical disc 8a has a cylindrical portion which is slidably engaged in a cylinder 6a of the output shaft 6 to form a servo device. A chamber 10 of the servo device is also communicated with the hydraulic circuit 20. A drive belt 11 engages with the drive pulley 7 and the driven pulley 8.

Secured to the output shaft 6 is a drive gear 12 which engages with an intermediate reduction gear 13 on an intermediate shaft 14. An intermediate gear 15 on the shaft 14 engages with a final gear 16. The rotation of the final gear 16 is transmitted to axles 18 of vehicle driving wheels 19 through a differential 17.

Figure 2B:
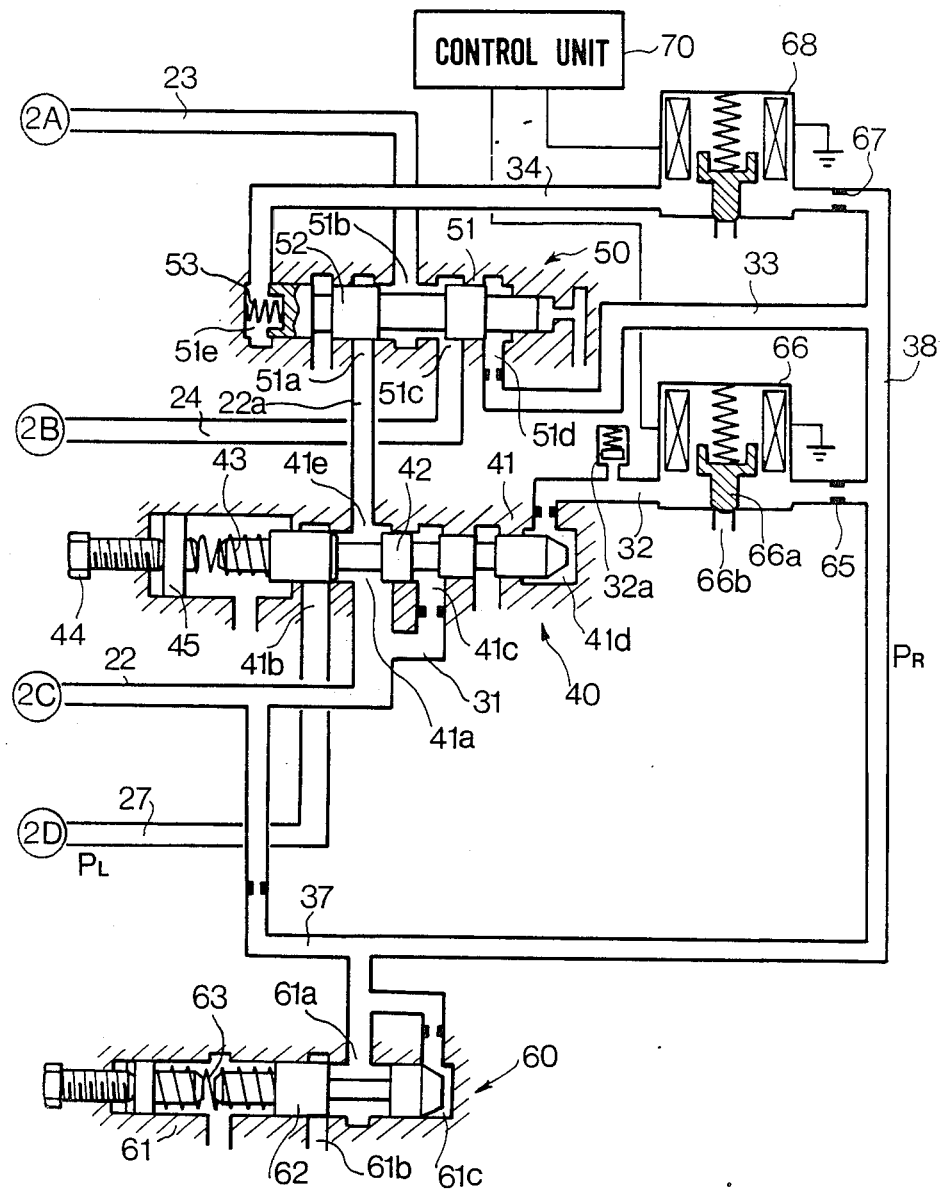

Referring to FIGS. 2a and 2b, the chamber 9 of the drive pulley 7 is supplied with pressurized oil by an oil pump 21 from an oil reservoir 26 passing through a line pressure conduit 22, ports 41a and 41e of a line pressure control valve 40, transmission ratio control valve 50, and a conduit 23. The chamber 10 of the driven pulley 8 is applied with pressurized oil through a passage 22b without passing through the valves 40 and 50. The movable conical disc 7a of the drive pulley 7 is so designed that the pressure receiving area thereof is larger than that of the movable conical disc 8a of the driven pulley 8. The line pressure control valve 40 comprises a valve body 41, spool 42, and chambers 41c and 41d. The spool 42 is applied with pressure of the pressurized oil in the chamber 41c supplied through a conduit 31. The other end of the spool 42 is applied with the force of a spring 43 provided between the end of the spool 42 and a retainer 45, the position of which is adjustable by a screw 44. The port 41a is communicated with a drain port 41b for a drain passage 27 in accordance with the position of a land of the spool 42. The drain port 41b communicates with oil reservoir 26 through the passage 27.

The transmission ratio control valve 50 comprises a valve body 51, spool 52, and spring 53 for urging the spool 52 in the downshift direction. A port 51b of the valve body 51 is selectively communicated with a pressure oil supply port 51a or a drain port 51c in accordance with the position of lands of spool 52. Port 51b communicates with the chamber 9 through conduit 23, and port 51a communicates with port 41e of line pressure control valve 40 through a conduit 22a. The drain port 51c is communicated with the oil reservoir 26 through a conduit 24 and a check valve 25.

The system is provided with a regulator valve 60, and solenoid operated on-off control valves 66 and 68.

The regulator valve 60 comprises a valve body 61, inlet port 61a connected to the pump 21 through passages 37, 22, spool 62, end chamber 61c connected to the passage 37, and spring 63 urging the spool 62 toward the chamber 61c. When the pressure of oil in the chamber 61c becomes higher than a set value, the spool 62 is shifted to the left, so that the inlet port 61a communicates with a drain port 61b to drain the oil. Thus, a constant pressure of oil is provided in the passage 37.

The passage 37 is communicated with the chamber 41d of line pressure control valve 40 through a constant pressure passage 38, orifice 65, solenoid operated on-off valve 66, and passage 32 having an accumulator 32a. Further, the passage 38 is communicated with an end chamber 51d of the transmission ratio control valve 50 through a passage 33, and with another end chamber 51e through a passage 34, orifice 67, and solenoid operated on-off valve 68. The solenoid operated on-off valve 66 is adapted to be operated by pulses. When energized, a valve 66a opens a drain port 66b. The pulsation of pressure of oil in the passage 32 is smoothed by accumulator 32a. The solenoid operated on-off valve 68 is the same as valve 66 in construction and operation. The solenoid operated on-off control valves 66 and 68 are operated by signals from a control unit 70. Thus, pressure controlled by the control valves 66 and 68 is applied to chambers 41d and 51e.

In the transmission ratio control valve 50, the pressure receiving area of the spool 52 at chamber 51e is set to a value larger than the area at the chamber 51d. On the other hand, the control pressure in the chamber 51e can be changed between a maximum value, which is the same as the constant pressure in the chamber 51d, when the duty ratio is 0% and zero by controlling the duty ratio of pulses for operating the control valve 68. The transmission ratio control valve 50 is so arranged that the spool 52 is at a neutral position at a middle duty ratio (for example 50%) and is located in an oil supply position by increasing the duty ratio from the middle duty ratio because of reduction of control pressure in the chamber 51e. Further, the speed of the movement of the spool 52 increases with increase of changing speed of the duty ratio. The spool 52 is shifted to an oil drain position by decreasing the duty ratio. It will be understood that when the oil is supplied to the chamber 9, the transmission is upshifted.

Figure 3A:
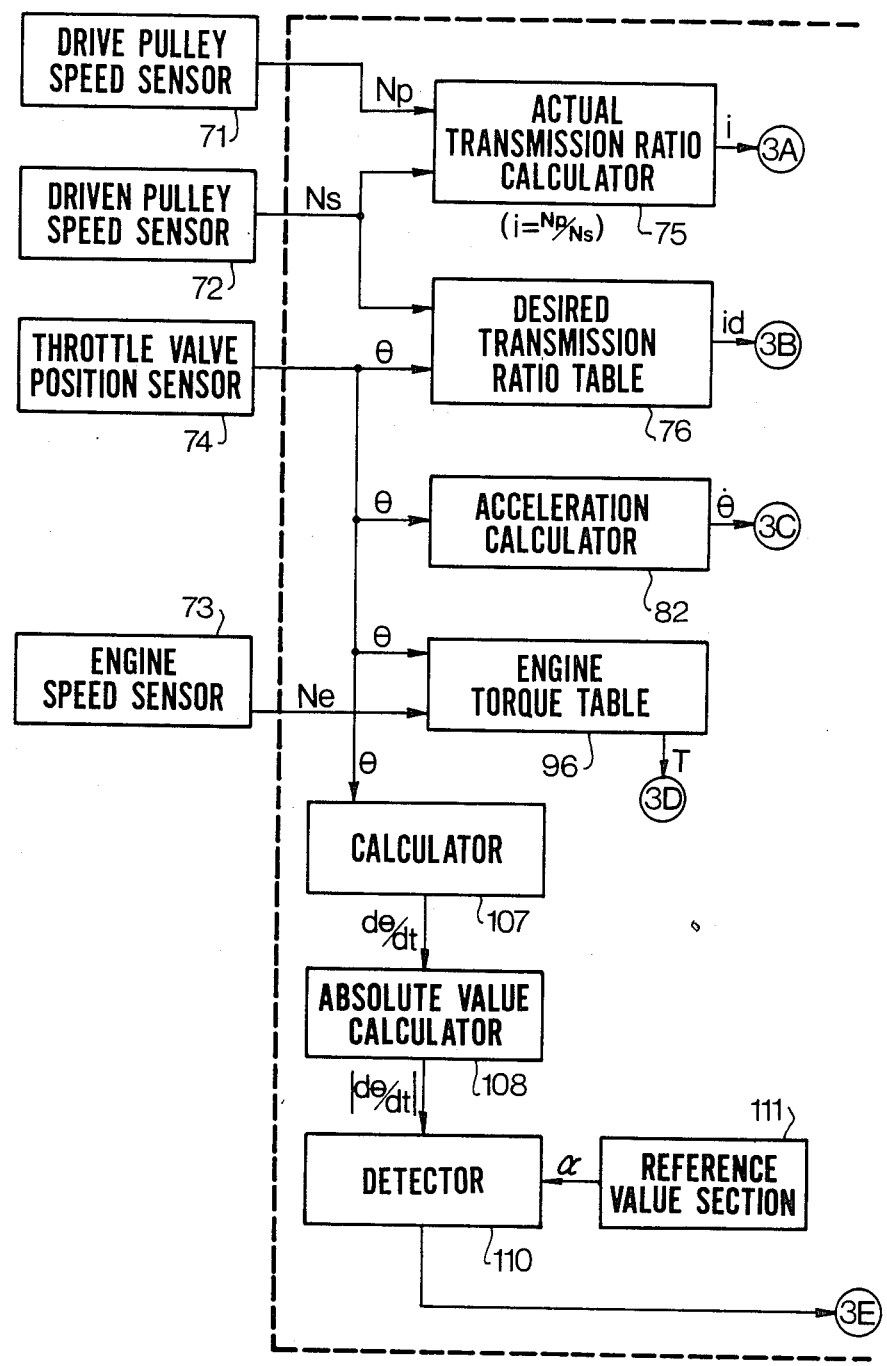
FIGS. 3a and 3b are block diagrams showing a control unit.
Figure 3B:
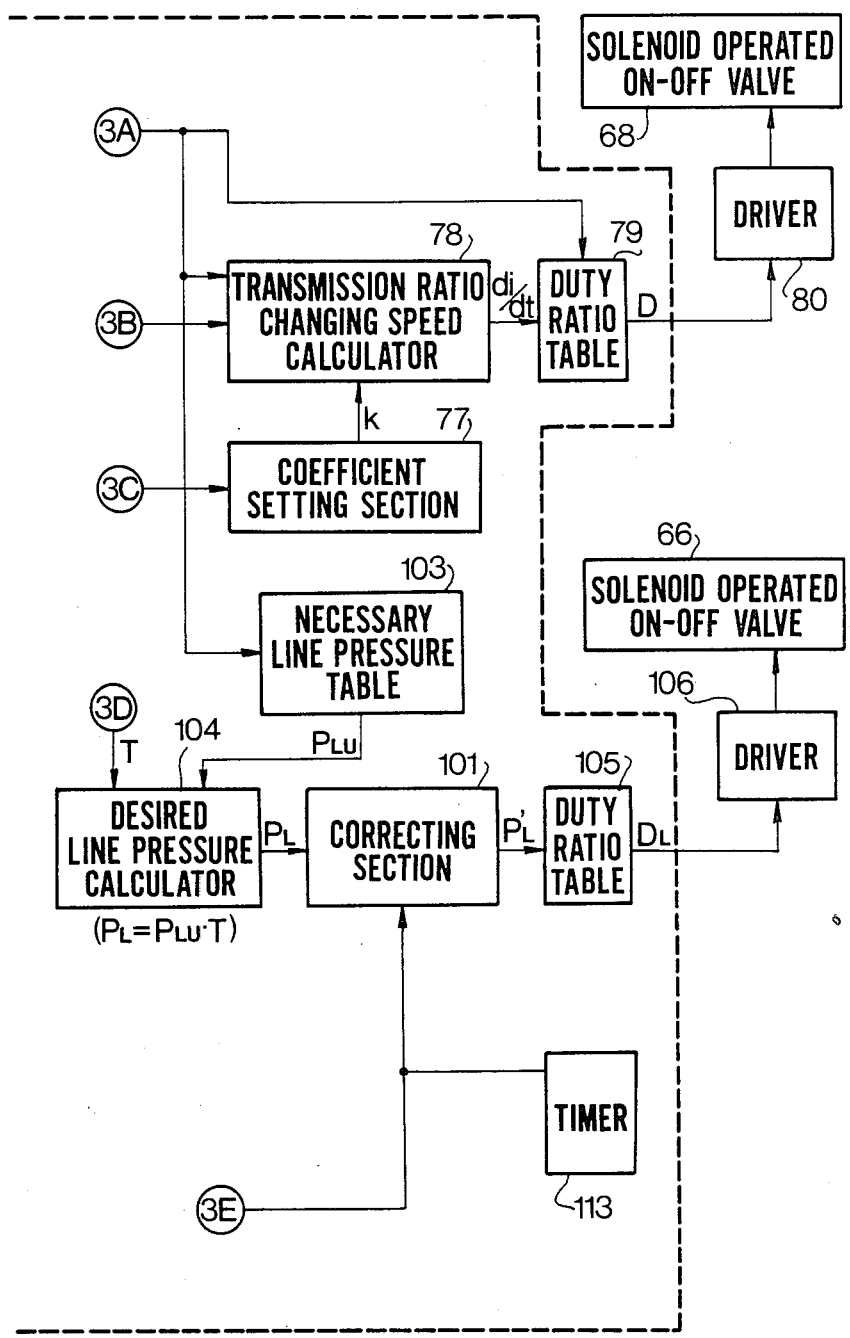

Referring to FIGS. 3a and 3b, a drive pulley speed sensor 71, driven pulley speed sensor 72, engine speed sensor 73 and throttle valve position sensor 74 are provided. Output signals $N_p$ and $N_s$ of the sensors 71, 72 are fed to an actual transmission ratio calculator 75 to produce an actual transmission ratio i in accordance with $i=N_p/N_s$. Output signal $N_s$ and output signal $\theta$ of the throttle valve position sensor 74 are fed to a desired transmission ratio table 76. The desired transmission ratio id is fetched from the table 76 in accordance with the signals $N_s$ and $\theta$. On the other hand, the output $\theta$ is fed to an acceleration calculator 82 to obtain acceleration $\dot{\theta}$. The signal of the acceleration $\dot{\theta}$ is supplied to a coefficient setting section 77 to produce a coefficient K. The actual transmission ratio i, desired transmission ratio id and coefficient K from the coefficient setting section 77 are applied to a transmission ratio changing speed calculator 78 to produce a transmission ratio changing speed di/dt from the formula di/dt=K(id−i).

The speed di/dt and actual transmission ratio i are applied to a duty ratio table 79 to derive the duty ratio D. The duty ratio D is supplied to the solenoid operated valve 68 through a driver 80.

On the other hand, the output signal $\theta$ of the throttle position sensor 74 and the output $N_e$ of the engine speed sensor 73 are fed to an engine torque table 96, so that engine torque T is obtained in accordance with throttle position $\theta$ and engine speed $N_e$.

On the other hand, the actual transmission ratio i from the calculator 75 is applied to a necessary line pressure table 103 to derive a necessary line pressure $P_{LU}$ per unit torque. The necessary line pressure $P_{LU}$ and the engine torque T are applied to a desired line pressure calculator 104 which calculates a desired line pressure $P_L$.

The desired line pressure $P_L$ is applied to a duty ratio table 105 through a correcting section 101 to derive a duty ratio $D_L$ corresponding to a corrected line pressure $P_L'$. The duty ratio $D_L$ is supplied to a driver 106 which operates the solenoid operated on-off valve 66 at the duty ratio.

Further, the signal $\theta$ from the throttle valve position sensor 74 is applied to a calculator 107 for calculating the throttle opening degree changing rate d$\theta$/dt. The output d$\theta$/dt of the calculator 107 is converted to an absolute value $|d\theta/dt|$ at an absolute value calculator 108. The absolute value $|d\theta/dt|$ is compared with a reference value $\alpha$ from a reference value section 111 at a detector 110 for detecting rapid changes of engine torque and transmission ratio. When the absolute value is larger than the reference value ($|d\theta/dt|>\alpha$), the detector 110 produces a correct signal dependent on the rate $d\theta/dt$. The correct signal is applied to the correcting section 101 for a predetermined time t set by a timer 113, so that the desired line pressure $P_L$ is increased. The reference value $\alpha$ and time t are changed in accordance with vehicle speed, engine speed and throttle position. Accordingly, the value $\alpha$ always changes in accordance with operating conditions of the engine and the driving condition of the vehicle.

At deceleration of the vehicle ($d\theta/dt<0$), the time t is changed in accordance with vehicle speed V so that the time t may become larger than $v/\beta$ (where $\beta$ is a maximum deceleration rate without slipping of the belt occurring). When a brake pedal of the vehicle is depressed after acceleration of the vehicle, the time t is extended.

When the vehicle is accelerated ($d\theta/dt>0$), the time t is changed in accordance with vehicle speed V, so that the time t may become larger than $t_{max}$ (time required to increase the vehicle speed up to a maximum vehicle speed).

In operation, while the vehicle is at a stop, chamber 10 of the driven pulley 8 is supplied with line pressure through passage 22b, and the chamber 9 of the drive pulley 7 is drained, since the $N_p$, $N_s$, $\theta$ and the duty ratio D are zero, and the spool 52 is at the right end position and the drain port 51c communicates with the chamber 9 through the conduit 23 as shown in FIGS. 2a and 2b. Thus, in the pulley and belt device of the continuously variable belt-drive transmission, the driving belt 11 engages with the driven pulley 8 at a maximum running diameter to provide the largest transmission ratio (low speed stage). When the accelerator pedal is depressed, the clutch current increases progressively with increasing of engine speed, so that the electromagnetic clutch 2 is gradually engaged, transmitting the engine power to the drive pulley 7. The power of the engine is transmitted to the output shaft 6 at the largest transmission ratio by the driving belt 11 and driven pulley 8, and further transmitted to axles 18 of the driving wheels 19. Thus, the vehicle is started.

At that time the line pressure is at the highest value by the line pressure control valve 40, since the duty ratio for the valve 66 is large, and the spool 42 of the line pressure control valve 40 is at the right end position. When the throttle valve is opened for acceleration, the desired transmission ratio id and transmission ratio changing speed di/dt are calculated by calculators 76, 78, and the duty ratio D is obtained from the table 79. The value of the duty ratio D is larger than the neutral value, so that the pressure in the chamber 51d of the transmission ratio control valve 50 is higher than the chamber 51e. Thus, the spool 52 is shifted to the left to communicate the port 51a with port 51b, so that oil is supplied to the chamber 9 through the conduit 23. On the other hand, the duty ratio for the solenoid operated on-off control valve 66 is reduced, thereby shifting the spool 42 of the valve 40 to the left. The port 41a communicates with the port 41b of the drain passage 27. Thus, line pressure reduces, and the transmission is upshifted, since oil is still supplied to the chamber 9 through the transmission ratio control valve 50.

The control operation of the line pressure will be described hereinafter with reference to FIGS. 2a, 2b, 3a, 3b, and 4. From the engine torque table 96, a torque T is obtained in accordance with throttle position $\theta$ and engine speed $N_e$, which is applied to desired line pressure calculator 104. The calculator 104 calculates a desired line pressure $P_L$. The solenoid operated on-off valve 66 is operated at a duty ratio corresponding to the desired line pressure $P_L$. The line pressure is applied to chamber 10 to hold the belt 11 at a necessary minimum force, wherein the transmitting torque at that time is slightly larger than torque T. Thus, power is transmitted through the transmission without slipping of the belt.

Figure 4:
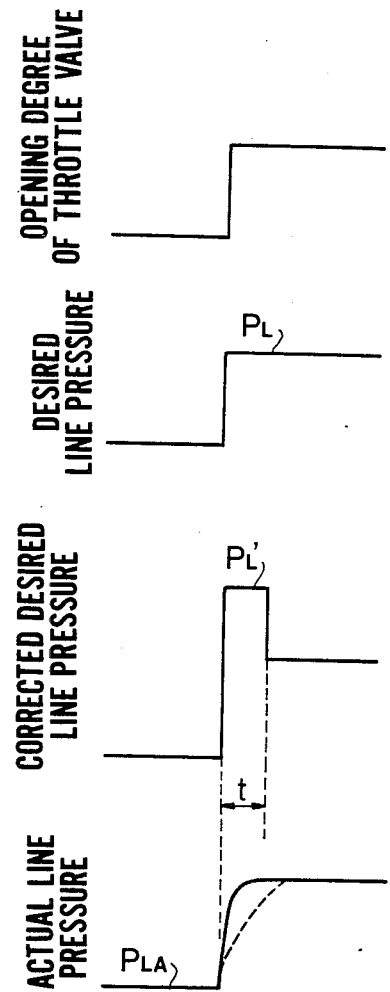
FIG. 4 illustrates waveforms at various portions of the system.

When the throttle valve is rapidly opened and the throttle opening degree changing rate $|d\theta/dt|$ is larger than the reference value $\alpha$, the detector 110 produces a correct signal. The correct signal is applied to the correcting section 101 for predetermined time t set by timer 113, so that the desired line pressure is increased to the corrected desired line pressure PL' as shown in FIG. 4. In accordance with the raised desired line pressure, the duty ratio $D_L$ is changed and the actual line pressure $P_{LA}$ is quickly increased as shown by solid line in FIG. 4 at a higher rate than an ordinary rate (shown by a dotted line) by the desired line pressure PL.

Thus, the line pressure is quickly increased in accordance with the rapid opening of the throttle valve before the engine torque actually increases. Accordingly, the belt is prevented from slipping on the pulleys, even if the engine torque rapidly increases. Thereafter, the desired line pressure is reduced, so that the line pressure decreases.

When the vehicle speed is high and the opening degree of the throttle valve is small, in the system, line pressure is set to a small value, which causes slipping of the belt. In order to prevent slipping, the reference value $\alpha$ is reduced and the time t is increased an with increase of the vehicle speed.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A control system for a continuously variable transmission for transmitting the power of an internal combustion engine to driving wheels of a motor vehicle through a clutch, having a drive pulley including a hydraulically shiftable disc and a first hydraulic cylinder for shifting the disc, a driven pulley including a hydraulically shiftable disc and a second hydraulic cylinder for operating the disc, a belt engaged with both pulleys, a line pressure control valve having ports and a spool, a transmission ratio control valve having ports and a spool, a first hydraulic circuit having a pump for supplying oil to the first and second cylinders, the system comprising:

a second hydraulic circuit for supplying the oil to the line pressure control valve so as to shift the spool;

control valve means provided in the second hydraulic circuit for controlling the amount of the oil supplied to the line pressure control valve;

first means for detecting opening degree of a throttle valve of said engine and for producing a first signal;

second means responsive to the first signal for producing a second signal representing changing of the opening degree with respect to time;

third means responsive to the second signal for detecting a rapid acceleration exceeding a predetermined magnitude and for producing a third signal;

fourth means responsive to the third signal for controlling said control valve means to increase the line pressure for a predetermined time so as to prevent slipping of the belt at the rapid acceleration.

2. The control system according to claim 1 wherein the control valve means is a solenoid operated on-off valve.

3. The control system according to claim 1 wherein the second hydraulic circuit is provided with a regulator valve for maintaining the pressure of oil at a constant value.

4. The control system according to claim 1, further comprising means for changing said predetermined magnitude in accordance with at least one of vehicle speed, engine speed and throttle position.

5. The control system according to claim 1, further comprising means for changing said predetermined time in accordance with at least one of vehicle speed, engine speed and throttle position.

6. A control system for a continuously variable transmission for transmitting the power of an internal combustion engine to driving wheels of a motor vehicle through a clutch, the transmission having a drive pulley including a hydraulically shiftable disc and a first hydraulic cylinder for shifting the disc, a driven pulley including a hydraulically shiftable disc and a second hydraulic cylinder for operating the disc of the driven pulley, a belt engaged with both pulleys, the control system including a line pressure control valve having ports and a spool for controlling line pressure acting on the belt via the second hydraulic cylinder, a transmission ratio control valve having ports and a spool for changing the transmission ratio of the transmission, a first hydraulic circuit having a pump for supplying oil to the second hydraulic cylinder with line pressure controlled by the line pressure control valve and to the first hydraulic cylinder via said transmission ratio control valve, the system further comprising:

a second hydraulic circuit for supplying oil to the line pressure control valve so as to shift the spool of the line pressure control valve;

control valve means provided in the second hydraulic circuit for controlling the amount of the oil supplied to the line pressure control valve;

first means for detecting opening degree of a throttle valve of said engine and for producing a first signal;

second means responsive to the first signal for producing a second signal representing changing of the opening degree with respect to time;

third means responsive to the second signal for producing a third signal when said second signal exceeds a predetermined magnitude;

fourth means responsive to the third signal for controlling said control valve means to increase the line pressure for a predetermined time so as to prevent slipping of the belt.

* * * * *